United States Patent [19]

Frisch et al.

[11] 4,454,251

[45] Jun. 12, 1984

[54] POLYUREA FOAMS PREPARED FROM ISOCYANATE, WATER, AND A LOWER-ALKANOL

[75] Inventors: Kurt C. Frisch, Grosse Ile, Mich.; Heinz Baumann, Kleinniedesheim, Fed. Rep. of Germany

[73] Assignee: Schaum-Chemie Wilhelm Bauer GmbH & Co. KG, Essen, Fed. Rep. of Germany

[21] Appl. No.: 487,869

[22] Filed: Apr. 22, 1983

Related U.S. Application Data

[63] Continuation-in-part of Ser. No. 374,039, May 3, 1982, abandoned.

[51] Int. Cl.$^3$ ............................................ C08G 18/14
[52] U.S. Cl. ...................................... 521/107; 521/117; 521/120; 521/122; 521/123; 521/131; 521/170
[58] Field of Search ............... 521/107, 117, 120, 122, 521/123, 131, 170; 528/49

[56] References Cited

U.S. PATENT DOCUMENTS 3,455,850 7/1969 Saunders .............................. 521/170
4,303,773 12/1981 Ganster et al. ........................ 528/49

OTHER PUBLICATIONS

Saunders et al., *Polyurethanes II*, Interscience, NY, 1964, p. 6.

*Primary Examiner*—Maurice J. Welsh
*Attorney, Agent, or Firm*—Gordon W. Hueschen

[57] ABSTRACT

Polyurea foam formulations, prepared by reacting a polymeric isocyanate with an aqueous activator component, and having incorporated therein a small but density-lowering and/or compressive strength enhancing amount of a lower-alkanol or alkylenediol, preferably having up to and including six (6) carbon atoms, especially isopropanol, are disclosed.

15 Claims, No Drawings

POLYUREA FOAMS PREPARED FROM ISOCYANATE, WATER, AND A LOWER-ALKANOL

The present application is a continuation-in-part of our prior-filed copending application Ser. No. 374,039, filed May 3, 1982, and now abandoned.

INTRODUCTION

This invention relates to polyurea foam compositions. More particularly, this invention provides new, improved polyurea foam compositions which are of lesser density and/or have improved compressive strength than polyurea foams without the additives disclosed herein.

BACKGROUND OF THE INVENTION

Polyurea foam compositions are relatively recent innovations in the foam art which have a relatively low density (about 0.5 lb/ft$^3$; 8 kg/m$^3$). These polyurea foams were developed mostly for use as retrofit insulation, show much greater resistance to ignition by small-scale sources than previously known urethane foams of the same low density, and are usually produced by reacting a polymeric isocyanate, especially a polyphenyl polymethylene polyisocyanate, and an aqueous activator formulation, the essential ingredients of which are water and a catalyst. Significant latitude in mixing ratio of polymeric isocyanate to water (e.g., 7.5:1 to 3:1, equivalent weight basis) is possible in these polyurea foam compositions, giving a wide range of reactivity values with little change in physical properties of the foam.

The original polyurea foam aqueous activator formulation comprised the following:

| Ingredient | Parts by Weight |
| --- | --- |
| H$_2$O | 15 |
| 2-methylimidazole | 4 |
| Pluracol ® 492(L-61) | 0.25 (surfactant) |

This aqueous activator formulation had a number of deficiencies in its process and handling parameters. Specifically, this formulation was very corrosive (having a pH of about 10), had a tendency to form polyurea foam base holes (large voids at the base of a foam container), and the 2-methylimidazole catalyst had a tendency to crystallize out of solution at temperatures below 10° C.

More recently, an improved aqueous activator formulation has comprised the following:

| Ingredient | Parts by Weight |
| --- | --- |
| H$_2$O | 15 |
| 2-methylimidazole | 2.0 |
| 1,2-dimethylimidazole | 1.0 |
| Boric acid | 1.0 |
| Pluronic ® L-62[1] | 0.25 |
| Sodium mercaptobenzothiazole | 0.02 |

[1]Pluronic ® L-62 = Poly(oxyethylene)poly(oxypropylene); BASF-Wyandotte

Such an aqueous activator formulation, while containing additional components, gives better processing latitude in making the polyurea foam, is storage stable to 0° C., and is much less corrosive to commonly used storage and process equipment materials.

Considerable development work by others in varying ratios of reactants in formulations has been done to determine the effects of polyol addition and the effects of various flame retardants in these polyurea foam compositions. Such results are shown by the following tables.

| EFFECTS OF POLYOL ADDITION | | | |
| --- | --- | --- | --- |
| H$_2$O | 21 | 21 | 21 |
| Fyrol CEF[1] | 30 | 25 | 15 |
| 2-MI[2] | 4 | 4 | 4 |
| LG-168[3] | — | 10 | 21 |
| RUBINATE-M[4] | 100 | 100 | 100 |
| Cream | 14 | 13 | 14 |
| End Rise | 65 | 70 | 80 |
| Density (Kg/m$^3$) | 6.4 | 6.3 | 6.7 |
| Bunsen Test | Very Good | Good | Fair |

N.B. CEF added to activator which gave unstable emulsion.
Addition to isocyanate (stable mixture) showed no change in results.
Substitution of Fyrol PCF for CEF resulted in coarser texture and reduced resistance to ignition.
[1]Fyrol CEF = tris(beta-chloroethyl)phosphate; Stauffer Chem. Co. ®
[2]2-MI = 2-methylimidazole
[3]LG-168 = poly(oxypropylene) adduct of glycerol; Union Carbide Corp. ®
[4]Rubinate-M = polymeric isocyanate; Rubicon Chem. Co. ® (polyphenyl polymethylene polyisocyanate)

| EFFECTS OF VARIOUS FIRE RETARDANTS | |
| --- | --- |
| Fyrol CEF 30 → 45 pbw. | Reduced friability, increased resistance to ignition. |
| Substitute 1,2 DMI[1] (2 pbw) for 2 MI (4 pbw) | Slight shrinkage, reduced physical properties. |
| Inclusion of NH$_4^+$ salts | |
| Ammonium Sulphonate | Collapse |
| Ammonium Bromide | Collapse |
| Diammonium hydrogen phosphate | Partial collapse, coarse. |
| Vircol 82[2] prepolymer | Fine texture, slight shrinkage, reduced ignition resistance. |
| Chlorinated Paraffins | Partial collapse, coarse. |

N.B. Choice of organic fire retardants is critical. Those that promote formation of oil in water emulsions during mixture of the activator and isocyanate usually result in collapsed foams. This is due to loss of blowing agent through the continuous phase.
[1]1,2 DMI = 1,2-dimethylimidazole
[2]Vircol 82 = phosphorus-containing polyol, 11.3% P; Mobil Chemical Co. ®

| EFFECTS OF RATIO AND CATALYST LEVEL CHANGES | | | | | | | | | |
| --- | --- | --- | --- | --- | --- | --- | --- | --- | --- |
| Sample | (1) | (2) | (3) | (4) | (5) | (6) | (7) | (8) | (9) |
| H$_2$O (pbw) | 15.0 | 22.6 | 25.0 | 28.2 | 37.3 | 28.8 | 29.2 | 29.6 | 31.05 |
| 2-methyl Imidazole | 2.0 | 3.0 | 2.0 | 3.8 | 5.0 | 3.4 | 3.2 | 2.85 | 1.9 |
| 1,2-dimethyl Imidazole | 1.0 | 1.5 | 1.0 | 1.9 | 2.5 | 1.7 | 1.6 | 1.42 | .95 |
| Boric Acid (Tech) | 1.0 | 1.5 | 1.0 | 1.9 | 2.5 | 1.9 | 1.9 | 1.9 | 1.9 |
| Pluronic L-62 ® | 0.25 | 0.38 | .25 | .47 | .62 | .47 | .47 | .47 | .47 |
| Sodium Mercapto Benzothiazole (NAMBT) | 0.02 | 0.03 | .02 | .036 | .048 | .036 | .036 | .036 | .036 |
| Fyrol CEF ® | 45.0 | 45.0 | 45.0 | 45.0 | 45.0 | 45.0 | 45.0 | 45.0 | 45.0 |
| RUBINATE-M ® | 100.0 | 100.0 | 100.0 | 100.0 | 100.0 | 100.0 | 100.0 | 100.0 | 100.0 |

| Sample | (1) | (2) | (3) | (4) | (5) | (6) | (7) | (8) | (9) |
|---|---|---|---|---|---|---|---|---|---|
| EFFECTS OF RATIO AND CATALYST LEVEL CHANGES | | | | | | | | | |
| Ratio (Iso/Activator) | 7.5/1 | 5/1 | 7.5/1 | 4/1 | 3/1 | 4/1 | 4/1 | 4/1 | 4/1 |
| Reactivity (sec.) Cream | 12 | 7 | 16 | 6 | 5 | 8 | 9 | 10 | 21 |
| End Rise | 72 | 40 | 65 | 50 | 35 | 57 | 67 | 75 | 130 |
| Tack Free | 75 | 40 | 60 | 50 | 35 | 57 | 67 | 75 | 155 |
| Density (lb/ft$^3$) | .41 | .43 | .50 | .40 | .48 | | | | |
| Exotherm (40" × 40" × 36") | 300° F. | 192° F. | 190° F. | — | 185° F. | — | 180° F. | | |
| Comments: | scorch | no scorch fine cell | excess H$_2$O on 5/1 no scorch base holes | no scorch fine cell | no scorch fine cell softer than (1) | 10% catalyst removed | 17% ratio retained no scorch | −25% by H$_2$O addition slightly coarse | −50% coarse |
| RMC ($/lb) 2/1/77 | 0.63 | | | | 0.66 | | 0.62 | | |

However, the foregoing foam compositions are more dense than desired for some applications. Those in the art continue to study to learn how to produce less dense polyurea foam compositions which retain substantial compressive strength and flame-retardant properties in an economical manner. In other cases, compressive strength is less than desired and could well be improved.

OBJECTS OF THE INVENTION

An object of this invention is to provide polyurea foams of lower density and/or higher compressive strength than prior art foam compositions.

It is another object of this invention to provide lightweight foam compositions for use in the packaging industry or for filling cavities as insulation while retaining sufficient compressive strength for practical utility in an economical manner.

It is another object of this invention to provide a process for providing lower density polyurea foams using mono-functional alcohols which do not impair the compressive strength or flame-retardant properties of the resulting polyurea-based foam composition, or certain di-functional alcohols which enhance the compressive strength of the foam.

Other objects, advantages, and purposes of the invention will be apparent to one skilled in the art from a reading of the specification and claims which follow.

SUMMARY OF THE INVENTION

Briefly, according to this invention it has been discovered that lower-density and/or higher compressive strength polyurea foam compositions can be prepared by incorporating into the formulations used to make said foams one or more mono- or di-functional alcohols, especially a lower-alkanol or alkylenediol, and preferably such a lower-alkanol or alkylenediol having up to and including six (6) carbon atoms, representatively methanol, ethanol, propanol, isopropanol, 1-butanol, methyl-2-butyl alcohol, ethylene glycol, and propylene glycol, but particularly isopropanol, into the foam, as by mixing into the aqueous activator component or polyurea foam formulation before blending the aqueous activator formulation with the polymeric isocyanate normally used to make said polyurea foam composition. We have discovered that the inclusion of such alcohol into the polyurea formulation enhances the lower-density property while not reducing the compressive strength and flame-retardant properties obtainable in the resulting polyurea-based foams, and frequently improves the compressive strength of the resulting foam, especially in the case of the alkylenediols. The concepts and principles of the present invention, as demonstrated with respect to polyurea foam compositions, can also be applied with full advantage to urethane-modified urea-based foam compositions as well as isocyanurate-urea foam compositions.

We have also discovered that: (1) calcium sulfate and fly ash, added to these formulations, provide higher compressive strength to the resulting polyurea foam; (2) addition of tris(2-chloropropyl)phosphate flame retardant with trichlorofluoromethane blowing agent increases the oxygen index (resistance to flame) of the polyurea foam; (3) the flame resistance of the polyurea foam increases as the content of the fly ash is increased in the formulation; (4) the density of the polyurea foam is increased as the fly ash content is increased, as does the friability of the foam; (5) the flame resistance of the polyurea foam with the addition of both tris(dichloropropyl)phosphate and alumina trihydrate is not higher than that with the tris(dichloropropyl)phosphate alone in the foam; (6) addition of trichlorofluoromethane blowing agent to the polyurea foam composition causes an increase in the rise time and tack free time in the processing of the foams, does not significantly effect the density of the foam at 10 weight percent (based on the isocyanate component) but does effect a lowering of the density of the polyurea foam as the content of the blowing agent increases to 20 weight percent, based on the weight of the isocyanate component; (7) if fly ash is used to increase compressive strength of the polyurea foam, it is better not to use alumina trihydrate as the flame retardant therein because the combination of fly ash and alumina trihydrate has the effect of lowering compressive strength of the polyurea foam; (8) the compressive strength of the polyurea foam is increased as the content of the fly ash is increased to 20 weight percent (based on the weight of the isocyanate) (see Table X), and then gradually decreased as the content of the alumina trihydrate/fly ash mixture (10 weight percent fly ash to 40 weight percent aluminum trihydrate, based on isocyanate) increases to over 50 percent of the polyurea foam formulation weight; and (9) the K factors for the various modified polyurea foams (from 0.42 to 0.52) of this invention are higher than expected (compared to a K factor of 0.22 for a carbon-dioxide-blown polyurethane foam of about 2 pcf.). This higher K factor is due to lower density and open cell structure of the resulting polyurea foams compared to conventional polyurethane foams having densities of 1.5 to 3 pcf.

A further and more concise summary of this invention is set forth in the claims appended hereto.

DETAILED DESCRIPTION OF THE INVENTION

More specifically, we have discovered that polyurea foam compositions with an isocyanate index ranging from about 40 to about 110 can be modified in advantageous ways by incorporation of an alcohol, especially a lower-alkanol or alkylenediol, and preferably such a lower alkanol or alkylenediol having up to and including six (6) carbon atoms, representatively methanol, ethanol, propanol, isopropanol, 1-butanol, and methyl-2-butyl alcohol thereinto, as by inclusion of said alcohol in the aqueous activator component of the polyurea foam composition before it is mixed with the polymeric isocyanate component, to effectively reduce the density of the foam while not reducing substantially the compressive strength and the flame-retardant values of the resulting polymeric foam, and/or to increase the compressive strength of the resulting foam, as when an alkylenediol is employed. The amount of alkanol or alkylenediol is usually up to about 15%, preferably up to about 5%, based on the weight of polyphenyl polymethylene polyisocyanate in the starting foam composition.

The addition of such an alcohol thus causes density reduction and frequently increased compressive strength in the resulting polyurea foam. The results are set forth in the detailed examples which follow. The data show that methanol, ethanol, or isopropanol produce a substantial density reduction in the polyurea foam. The addition of 1-propanol or 1-butanol usually causes a density drop in the resulting foam. The largest effect in reducing density of the foam was found upon adding isopropanol into the formulation. Even in polyurea foams containing alumina trihydrate, the addition of isopropanol reduced the density of the resulting foam. Upon studying these various foams, it was found that the compressive strength was also improved upon adding isopropanol and calcium sulfate or fly ash to the polyurea foam formulation. The examples further show that the compressive strength of the polyurea foam was improved by adding ethylene glycol or other alkylenediol, e.g., propylene glycol, to the formulation. The added alcohols not only expanded the foam to a lower density, but probably also reacted with the polymeric isocyanate component of the foam to form urethane structures which changed the compressive strength in the polyurea foam composition.

The properties of these new polyurea foams, modified with alumina trihydrate and alkanols or alkylenediols, e.g., isopropanol, are set forth in the examples. Using the oxygen index as an indicator, as shown in the tables, the polyurea foams containing the added amount of selected mono- or dihydric alcohol were self-extinguishing as the alumina trihydrate reached about 20 weight percent, based on isocyanate content. The oxygen index was also increased by adding a small amount of a flame retardant, such as Fyrol(R) FR-2 [tris(2-chloropropyl)phosphate] to the polyurea foam formulation which contained the alumina trihydrate.

In conjunction with our studies on the density of foam, we have discovered that the inclusion of an additional catalyst, for example, T-12 (dibutyl tin dilaurate) increased the processing rate of the resulting polyurea foam and increased slightly the compressive strength of the resulting polyurea foam composition.

The advantage of incorporating the added components into polyurea foam formulations is illustrated by the following detailed Preparations and Examples setting forth the formulations, the processing times, and the properties of the resulting foams.

Preparations 1 to 3

VARYING ISOCYANATE INDEX (I.I)* OF UNMODIFIED POLYUREA FOAMS BY VARYING WATER CONTENT IN FORMULATIONS

*I.I = (NCO/OH) × 100

The following polyurea foams were prepared by the one-shot method: a homogeneous liquid mixture containing water, surfactant, and catalyst was blended with the required amount of polymeric isocyanate reactant using a high-speed stirrer. The blended mixture was poured into a paper carton and was allowed to rise freely and cure at room temperature. All foams were conditioned for one week at room temperature before testing.

TABLE I

ISOCYANATE INDEX ON POLYUREA FOAMS

| | Preparations 1 to 3 | | |
|---|---|---|---|
| | 1 | 2 | 3 |
| FORMULATION | | | |
| Mondur MR, g[1] | 102 | 100.3 | 101.2 |
| H$_2$O, g | 13.5 | 9.0 | 6.44 |
| A-51806, g[2] | 1.0 | 1.0 | 1.0 |
| L-540, g[3] | 2.0 | 2.0 | 2.0 |
| I.I. | 51.1 | 75.4 | 106.3 |
| PROCESSING | | | |
| Cream time, sec. | 20 | 15 | 15 |
| Rise Time, sec. | 40 | 45 | 40 |
| Tack free time, sec. | 60 | 55 | 80 |
| PROPERTIES | | | |
| Density, pcf. | 0.4614 | 0.4286 | 0.5346 |
| Dimensional change (%) at | | | |
| Thermal aging at 120° C. for 4 days | 0 | 0 | 0 |
| Humidity aging at 70° C. and 100% RH for 3 days | 0 | 0 | 0 |
| Compressive strength, psi | | | |
| ∥ | 1.69 | 1.94 | 2.26 |
| ⊥ | 1.30 | 1.25 | 2.01 |

[1]Polymeric MDI; Mobay Chemical Co. ®
[2]A-51806 = Polycat 17; Abbott Labs. ®
[3]L-540 = Silicone copolymer surfactant; Union Carbide ®

Testing of Foams

1. Density-ASTM D-1564

A specimen with the size of 2"×2"×2" was cut from the foam and used for the density test.

2. Compressive Strength-ASTM D-1621

Specimens with the dimensions of 2"×2"×1" were used for the test. The compressive strength was calculated from the maximum load (a yield point or a 10% deformation was reached), dividing the area of cross sections.

3. Dimensional Change-ASTM D-2126-75

Specimens with dimensions of 4"×4"×1" were used for the test. The conditions for thermal aging and humid aging test were chosen at 120° C. and 70° C., 100% relative humidity, respectively.

4. Oxygen Index-ASTM D-2863

The Michigan Chemical Oxygen Index Tester, Model 95-001-01, was used for measurements. The dimensions of specimens were ½"×½"×5". The oxygen index (O.I.) was calculated using the following equation:

$$O.I. = \frac{(O_2) \times 100}{(O_2) + (N_2)}$$

where $(O_2)$ and $(N_2)$ are volumetric flow rate of $O_2$ and $N_2$, respectively.

Polyurea foams with low isocyanate index (I.I=25) collapsed during the processing and no further measurements were made on them. Properties of unmodified polyurea foams with various isocyanate index numbers, ranging from 50.1 to 106.3 because of differences in water content in their formulations, are set forth above. There was no significant density change of polyurea foams with various isocyanate index changes. These polyurea foams exhibited excellent dimensional stability on thermal aging and humid aging.

EXAMPLES 1 TO 5
EFFECT OF VARIOUS LOWER ALKANOLS AND ALKYLENE GLYCOLS ON PROPERTIES OF POLYUREA FOAMS.

The following polyurea foam formulations were prepared by the one-shot method as described in the preparation description above, except that about five grams of methanol, ethanol, isopropanol, 1-butanol, or ethylene glycol, respectively, were included in the foam formulation recipe, and the resulting foam was compared with a foam formulation containing no such alcohol additive (standard). The formulations were selected to approximate the same I.I. (about 75), as indicatted from Preparation 2 above. The alkanols and glycol addition was done by premixing the indicated amount of the alcohol or glycol with the water-containing mixture and that resulting water mixture was mixed or blended with the isocyanate reactant to form the total urea foam-making composition.

EXAMPLES 6 TO 9
EFFECT OF ISOPROPANOL WITH AND WITHOUT ALUMINA TRIHYDRATE ON PROPERTIES OF POLYUREA FOAM COMPOSITIONS

The following polyurea foam formulations were prepared containing none or about 5 grams of isopropanol in the foam formulation, either as the only additional additive (Example 9) or with or without about 40 grams of alumina trihydrate in the foam formulation (standard Example 7). Both the isopropanol and the alumina trihydrate were introduced into the formulations by adding the indicated amounts of each into the water-containing mixtures, as indicated in the Preparations hereinabove, and then the water-based reactant mixture was blended with the polymeric isocyanate reactant mixture component for foam formation.

TABLE III
EFFECT OF ISOPROPANOL ON POLYUREA FOAMS

|  | standard | Examples 7 | 8 | 9 |
|---|---|---|---|---|
| FORMULATION |  |  |  |  |
| Mondor MR, g | 99.4 | 99.45 | 100.3 | 100.1 |
| H$_2$O, g | 13.5 | 13.5 | 13.5 | 13.5 |
| Isopropanol, g | — | 5.0 | — | 5.0 |
| A-51806, g | 1.5 | 1.5 | 1.5 | 1.5 |
| L-540, g | 2.0 | 2.0 | 2.0 | 2.0 |
| Al$_2$O$_3$ 3H$_2$O, g | 40.9 | 39.9 | — | — |
| Isocyanate Index (without alcohols) | 49.8 | 49.8 | 50.3 | 50.2 |
| PROCESSING |  |  |  |  |
| Cream time, sec. | 25 | 25 | 30 | 25 |
| Rise time, sec. | 45 | 55 | 45 | 55 |
| Tack free time, sec. | 55 | 65 | 60 | 65 |
| PROPERTIES |  |  |  |  |
| Density, pcf | 0.757 | 0.663 | 0.417 | 0.385 |
| Oxygen index | 23.25 | 23.25 | 20.25 | 20.25 |
| Compressive strength, psi |  |  |  |  |
| ∥ | 0.70 | 1.24 | 1.32 | 1.34 |
| ⊥ | 0.79 | 1.12 | 1.06 | 1.30 |

TABLE II
EFFECTS OF ALCOHOLS ON POLYUREA FOAMS

|  | standard | Example 1 | 2 | 3 | 4 | 5 |
|---|---|---|---|---|---|---|
| FORMULATION |  |  |  |  |  |  |
| Mondur MR, g | 100.3 | 100.4 | 101.0 | 100.5 | 101.4 | 100.9 |
| H$_2$O, g | 9.0 | 9.0 | 9.0 | 9.0 | 9.0 | 9.0 |
| Methanol, g | — | 4.0 | — | — | — | — |
| Ethanol, g | — | — | 5.0 | — | — | — |
| Isopropanol, g | — | — | — | 5.0 | — | — |
| 1-Butanol, g | — | — | — | — | 5.0 | — |
| Ethylene glycol, g | — | — | — | — | — | 5.0 |
| A-51806, g | 1.0 | 1.0 | 1.0 | 1.0 | 1.5 | 2.0 |
| L-540, g | 2.0 | 2.0 | 2.0 | 2.0 | 2.0 | 2.0 |
| Isocyanate index (without alcohols) | 75.4 | 75.5 | 75.9 | 75.6 | 76.2 | 75.9 |
| PROCESSING |  |  |  |  |  |  |
| Cream time, sec. | 15 | 12 | 12 | 20 | 20 | 20 |
| Rise time, sec. | 45 | 15 | 40 | 60 | 45 | 30 |
| Tack free time, sec. | 55 | 45 | 60 | 70 | 55 | 40 |
| PROPERTIES |  |  |  |  |  |  |
| Density, pcf. | 0.4286 | 0.405 | 0.395 | 0.3441 | 0.4321 | 0.425 |
| Oxygen index | — | — | — | — | 19.75 | 19.75 |
| Compressive strength, psi |  |  |  |  |  |  |
| ∥ | 1.94 | 1.98 | 1.84 | 1.91 | 1.54 | 2.36 |
| ⊥ | 1.25 | 1.70 | 1.21 | 1.41 | 1.44 | 0.79 |
| Dimensional change (%) |  |  |  |  |  |  |
| Thermal aging (120° C., 4 days) | 0 | 0 | 0 | 0 | — | — |
| Humid aging (70° C., 100% RH 3 days) | 0 | 0 | 0 | 0 | — | — |

EXAMPLES 10 AND 11
EFFECT OF ETHYLENE GLYCOL ON POLYUREA FOAMS MODIFIED WITH ALUMINA TRIHYDRATE

The following polyurea foam formulations were prepared containing none or about 5 grams of ethylene glycol in the formulations. Both formulations also contained about 40 grams of alumina trihydrate. These glycol and alumina additives were added to the water/surfactant/catalyst mixture described in the foregoing Preparations and the resultant aqueous mixtures were blended with the polymeric isocyanate component for foam formation as in the foregoing.

TABLE IV
EFFECT OF ETHYLENE GLYCOL ON POLYUREA FOAMS MODIFIED WITH ALUMINA TRIHYDRATE

|  | Examples | |
|---|---|---|
|  | 10 | 11 |
| FORMULATION | | |
| Mondur MR, g | 99.1 | 100.3 |
| $H_2O$, g | 13.5 | 13.5 |
| Ethylene glycol, g | — | 5.0 |
| A-51806, g | 1.5 | 1.5 |
| L-540, g | 2.0 | 2.0 |
| $Al_2O_3\ 3H_2O$, g | 40.9 | 40.0 |
| Isocyanate index (without alcohols) | 49.7 | 50.3 |
| PROCESSING | | |
| Cream time, sec. | 25 | 25 |
| Rise time, sec. | 45 | 45 |
| Tack free time, sec. | 55 | 50 |
| PROPERTIES | | |
| Density, pcf | 0.757 | 0.766 |
| Oxygen index | 23.25 | 23.25 |
| Compressive strength, psi | | |
| ∥ | 0.70 | 1.32 |
| ⊥ | 0.79 | 1.42 |

The above Examples illustrate that the addition of methanol, ethanol, and isopropanol produced lower density in polyurea foams. The addition of 1-butanol and ethylene glycol apparently did not produce any substantial reduction in foam density. No significant improvement in foam cell structure was noted by the addition of 1-propanol. The biggest effect in reducing density of the foams was produced by adding isopropanol to the formulations. Even in the polyurea foams containing alumina trihydrate, addition of isopropanol also reduced the density of the resulting foams. Moreover, the data show that the compressive strength of the resulting polyurea foams was also improved by the addition of isopropanol or ethylene glycol.

In theory, to which we do not wish to be bound, apparently the alcohol or ethylene glycol may not only expand the polyurea foam composition to a lower density, but the alcohol or glycol probably also reacts with the isocyanate to form urethane structures which change the compressive strength of the resulting polyurea foam.

EXAMPLES 12 TO 16
EFFECT OF ISOPROPANOL, ALUMINA TRIHYDRATE, AND FLAME RETARDANT ON PROPERTIES OF POLYUREA FOAM FORMULATIONS

The following polyurea foams (Table V) illustrate further the effects of adding alumina trihydrate and isopropanol to the polyurea foam formulation, as well as a flame retardant, here Fyrol FR-2 (Table VI). The indicated amounts of isopropanol, alumina trihydrate, and flame retardant were blended into the aqueous liquid phase as described above, before blending it with the polymeric isocyanate component of the formulation.

TABLE V
EFFECT OF FIRE RETARDANT ALUMINA TRIHYDRATE ON POLYUREA FOAMS

|  | Examples | | |
|---|---|---|---|
|  | 12 | 13 | 14 |
| FORMULATION | | | |
| Mondur MR, g | 100.1 | 100 | 99.45 |
| $H_2O$, g | 13.5 | 13.5 | 13.5 |
| Isopropanol, g | 5.0 | 5.0 | 5.0 |
| A-51806, g | 1.5 | 1.5 | 1.5 |
| L-540, g | 2.0 | 2.0 | 2.0 |
| $Al_2O_3\ 3H_2O$, g | — | 19.5 | 39.9 |
| Isocyanate Index | 50.2 | 50.2 | 49.8 |
| PROCESSING | | | |
| Cream time, sec. | 25 | 25 | 25 |
| Rise time, sec. | 55 | 60 | 55 |
| Tack free time, sec. | 65 | 73 | 65 |
| PROPERTIES | | | |
| Density, pcf | 0.385 | 0.555 | 0.663 |
| Oxygen index | 20.25 | 21.25 | 23.25 |
| Compressive strength, psi | | | |
| ∥ | 1.34 | 1.74 | 1.24 |
| ⊥ | 1.30 | 1.20 | 1.12 |

TABLE VI
EFFECT OF FYROL FR-2 ON POLYUREA FOAMS MODIFIED WITH ALUMINA TRIHYDRATE

|  | Examples | |
|---|---|---|
|  | 15 | 16 |
| FORMULATION | | |
| Mondur MR, g | 99.45 | 99.1 |
| $H_2O$, g | 13.5 | 13.5 |
| Isopropanol, g | 5.0 | 5.0 |
| A-51806, g | 1.5 | 1.5 |
| L-540, g | 2.0 | 2.0 |
| $Al_2O_3\ 3H_2O$, g | 39.9 | 40.8 |
| Fyrol FR-2, g | — | 5.0 |
| Isocyanate Index | 49.8 | 49.7 |
| PROCESSING | | |
| Cream time, sec. | 25 | 25 |
| Rise time, sec. | 55 | 55 |
| Tack free time, sec. | 65 | 70 |
| PROPERTIES | | |
| Density, pcf | 0.663 | 0.612 |
| Oxygen index | 23.25 | 24.75 |
| Compressive strength, psi | | |
| ∥ | 1.24 | 1.33 |
| ⊥ | 1.12 | 1.08 |

The oxygen index figures for these polyurea foams indicate the relative flame resistance of the resulting polyurea foams, the higher the oxygen index the higher the flame resistance of the foam materials. The polyurea foams were self-extinguishing as the content of the alumina trihydrate reached about 20 percent by weight based on isocyanate weight content. The oxygen index was also increased by adding a small amount of the flame retardant, here Fyrol FR-2, in the polyurea formulation which contained alumina trihydrate.

EXAMPLES 17 TO 18

EFFECT OF COMBINATION OF CATALYSTS ON PROPERTIES OF POLYUREA FOAM FORMULATIONS

The following polyurea foam formulations were made by the one-shot procedure described above so as to contain isopropanol, alumina trihydrate, and one (A-51806) or two (A-51806 plus T-12) catalyst components in the formulation for foam formation. The isopropanol, alumina, and catalyst components were added via the aqueous phase before the aqueous phase was blended with the polymeric isocyanate component.

TABLE VII
EFFECT OF CATALYST T-12 ON POLYUREA FOAMS MODIFIED WITH ALUMINA TRIHYDRATE

|  | Examples | |
|---|---|---|
|  | 17 | 18 |
| FORMULATION | | |
| Mondur MR, g | 99.45 | 96.8 |
| H$_2$O, g | 13.5 | 13.5 |
| Isopropanol, g | 5.0 | 5.0 |
| A-51806, g | 1.5 | 1.5 |
| T-12, g | — | 0.1 |
| L-540, g | 2.0 | 2.0 |
| Al$_2$O$_3$ 3H$_2$O, g | 39.9 | 40.1 |
| Isocyanate index | 49.8 | 48.5 |
| PROCESSING | | |
| Cream time, sec. | 25 | 20 |
| Rise time, sec. | 55 | 50 |
| Tack free time, sec. | 65 | 55 |
| PROPERTIES | | |
| Density, pcf | 0.663 | 0.668 |
| Oxygen index | 23.25 | 23.25 |
| Compressive strength, psi | | |
| ∥ | 1.24 | 1.34 |
| ⊥ | 1.12 | 1.31 |

The test data on these resulting foams show that the addition of the second catalyst component, T-12, increased the processing rate and increased the compressive strength of the resulting foam. We believe the improved compressive strength property of the foam was probably due to more complete reaction in the polyurea foams.

EXAMPLES 19 TO 22

EFFECT OF CALCIUM SULFATE AND FLY ASH ON PROPERTIES OF POLYUREA FOAMS

The following polyurea foam formulations were made by the one-shot procedure described above so as to contain the indicated amounts of calcium sulfate or fly ash in the respective formulations. The calcium sulfate or fly ash components were added via the aqueous phase before the aqueous phase was blended with the polymeric isocyanate component.

TABLE IX
Effect of Calcium Sulfate on Polyurea Foams

|  | Examples | | |
|---|---|---|---|
|  | standard | 19 | 20 |
| FORMULATION | | | |
| Mondur MR, g | 101.85 | 100.05 | 100.0 |
| H$_2$O, g | 13.5 | 13.5 | 13.5 |
| Isopropanol, g | 5.0 | 5.0 | 5.0 |
| A-53234, g | 2.0 | 2.0 | 2.0 |
| L-540, g | 2.0 | 2.0 | 2.0 |
| CaSO$_4$ ½H$_2$O, g | — | 20.0 | 40.0 |
| Isocyanate Index (without alcohol) | 51.1 | 50.2 | 50.1 |
| PROCESSING | | | |
| Cream time, sec | 25 | 30 | 25 |
| Rise time, sec | 45 | 65 | 75 |
| Tack free time, sec | 55 | 80 | 90 |
| PROPERTIES | | | |
| Density, pcf | 0.353 | 0.530 | 0.666 |
| Oxygen index | 20.25 | 20.25 | 20.75 |
| Compressive strength, psi | | | |
| ∥ | 1.26 | 1.57 | 1.29 |
| ⊥ | 0.98 | 1.37 | 1.00 |
| K-factor, btu-in/hr-ft$^2$-°F. | 0.52 | | 0.47 |

TABLE X
Effect of Fly Ash on Polyurea Foams

|  | Examples | | |
|---|---|---|---|
|  | standard | 21 | 22 |
| FORMULATION | | | |
| Mondur MR, g | 101.85 | 101.44 | 101.95 |
| H$_2$O, g | 13.5 | 13.5 | 13.5 |
| Isopropanol, g | 5.0 | 5.0 | 5.0 |
| A-53234, g | 2.0 | 2.0 | 2.0 |
| L-540, g | 2.0 | 2.0 | 2.0 |
| Fly ash, g | — | 20.0 | 40.0 |
| Isocyanate Index (without alcohol) | 51.1 | 50.9 | 51.1 |
| PROCESSING | | | |
| Cream time, sec | 25 | 25 | 25 |
| Rise time, sec | 45 | 43 | 45 |
| Tack free time, sec | 55 | 55 | 55 |
| PROPERTIES | | | |
| Density, pcf | 0.353 | 0.504 | 0.668 |
| Oxygen index | 20.25 | 20.25 | 20.75 |
| Compressive strength, psi | | | |
| ∥ | 1.26 | 1.57 | 1.24 |
| ⊥ | 0.98 | 1.47 | 1.10 |
| K-factor, btu-in/hr-ft$^2$-°F. | 0.52 | | 0.46 |

EFFECT OF CALCIUM SULFATE AND FLY ASH ON POLYUREA FOAMS

The properties of polyurea foams modified with calcium sulfate and fly ash are listed in Tables IX and X. The results showed that the effect of both materials on the properties of the resulting foams was similar. No significant improvement in fire retardance was observed from the oxygen index data. The compressive strength data showed that the polyurea foams containing 20 wt% (based on isocyanate) of calcium sulfate or fly ash had higher compressive strengths. Even the polyurea foams containing 40 wt% of calcium sulfate or fly ash did not exhibit reduced compressive strengths. The only difference between these two additives was that the addition of calcium sulfate caused a slower rate in the processing of the polyurea foams, whereas the addition of fly ash did not. The slower rate from the addition of calcium sulfate in the polyurea foams may possibly be due to the increased viscosity of the premixed component of isocyanate and calcium sulfate in the processing.

EXAMPLES 23 TO 31

EFFECT OF Fyrol®FR-2 AND Phos-Chek® FLAME RETARDANTS AND Freon® 11B BLOWING AGENT ON POLYUREA FOAM COMPOSITIONS MODIFIED WITH ISOPROPANOL The following polyurea foam formulations were made by the one-shot procedure described above so as to contain the indicated amounts of Phos-Chek® brand of ammonium polyphosphate flame retardant or Fyrol®FR-2 brand of tris(dichloropropyl)phosphate flame retardant in the respective formulations. The flame retardant components were added via the aqueous phase before the aqueous phase was blended with the polymeric isocyanate component.

Also, in some of the exemplified formulations, the indicated amount of Freon®11B brand of trichlorofluoromethane blowing agent component was added via the aqueous phase before the aqueous phase was blended with the polymeric isocyanate component.

TABLE XI

Effect of Phos-Chek® on Polyurea Foams

| | | Examples | |
|---|---|---|---|
| | standard | 23 | 24 |
| FORMULATION | | | |
| Mondur MR, g | 101.3 | 100.0 | 100.0 |
| $H_2O$, g | 13.5 | 13.5 | 13.5 |
| Isopropanol, g | 5.0 | 5.0 | 5.0 |
| A-53234[1], g | 2.0 | 2.0 | 2.5 |
| DC 198[2], g | 2.0 | 2.0 | 2.0 |
| Phos-Chek®, g | — | 20.0 | 20.0 |
| Isocyanate Index (without alcohol) | 50.8 | 50.1 | 50.1 |
| PROCESSING | | | |
| Cream time, sec | 30 | — | — |
| Rise time, sec | 55 | — | — |
| Tack free time, sec | 60 | — | — |
| PROPERTIES | | | |
| Density, pcf | 0.359 | (no reaction) | (no reaction) |
| Oxygen index | 20.00 | | |
| Compressive strength, psi | | | |
| ∥ | 1.00 | | |
| ⊥ | 0.89 | | |

[1] A-53234 = tert. amine catalyst; Abbott Labs.
[2] DC-198 = Silicone surfactant; Dow Corning Corp.

TABLE XII

Effect of Fire Retardant Fyrol® FR-2 on Polyurea Foams with Freon 11B as Blowing Agent

| | | Examples | | |
|---|---|---|---|---|
| | standard | 25 | 26 | 27 |
| FORMULATION | | | | |
| Mondur MR, g | 102.0 | 102.9 | 101.1 | 103.3 |
| $H_2O$, g | 13.5 | 13.5 | 13.5 | 13.5 |
| Isopropanol, g | 5.0 | 5.0 | 5.0 | 5.0 |
| Polycat® 17, g | 2.0 | 2.0 | 2.0 | 2.0 |
| L-540, g | 2.0 | 2.0 | 2.0 | 2.0 |
| Freon 11B, g | 10.0 | 20.0 | 20.0 | 20.0 |
| Fyrol FR-2, g | — | — | 10.0 | 20.0 |
| Isocyanate Index (without alcohol) | 51.2 | 51.6 | 50.7 | 51.8 |
| PROCESSING | | | | |
| Cream time, sec | 25 | 25 | 25 | 20 |
| Rise time, sec | 45 | 60 | 50 | 50 |
| Tack free time, sec | 60 | 70 | 60 | 60 |
| PROPERTIES | | | | |
| Density, pcf | 0.382 | 0.401 | 0.393 | 0.404 |
| Oxygen index | 20.25 | 20.25 | 22.75 | 23.75 |

TABLE XIII

Effect of Freon® 11B on Polyurea Foams

| | Standard | Examples | | | |
|---|---|---|---|---|---|
| | | 28 | 29 | 30 | 31 |
| FORMULATION | | | | | |
| Mondur MR, g | 101.3 | 100.35 | 200.0 | 99.35 | 201.2 |
| $H_2O$, g | 13.5 | 13.5 | 27.0 | 13.5 | 27.0 |
| Isopropanol, g | 5.0 | 5.0 | 10.0 | 5.0 | 10.0 |
| A-53234, g | 2.0 | 2.0 | 4.0 | 2.0 | 4.0 |
| DC 198, g | 2.0 | 2.0 | 4.0 | 2.0 | 4.0 |
| Freon 11, g | — | 10.0 | — | 10.0 | 40.0 |
| $Al_2O_3 \cdot \tfrac{1}{2}H_2O$, g | — | — | 80.0 | 40.0 | 80.0 |
| Fly ash, g | — | — | 20.0 | 10.0 | 20.0 |
| Isocyanate Index (without alcohol) | 50.8 | 50.3 | 50.1 | 49.8 | 50.4 |
| PROCESSING | | | | | |
| Cream time, sec | 30 | 35 | 30 | 35 | 35 |
| Rise time, sec | 55 | 65 | 50 | 75 | 75 |
| Tack free time, sec | 60 | 75 | 60 | 90 | 95 |
| PROPERTIES | | | | | |
| Density, pcf | 0.559 | 0.363 | 0.853 | 0.800 | 0.688 |
| Oxygen index | 20.00 | 20.25 | 23.25 | 23.25 | 23.25 |
| Compressive strength, psi | | | | | |
| ∥ | 1.00 | 1.21 | 1.06 | 0.87 | 1.14 |
| ⊥ | 0.80 | 0.96 | 0.99 | 0.69 | 0.54 |
| K-factor, btu-in/hr-$ft^2$-°F. | | 0.42 | | | 0.52 |

EFFECT OF FIRE RETARDANTS ON POLYUREA FOAMS

The addition of Phos-Chek® flame retardant in polyurea foams caused no reaction in the resulting formulation. This is probably due to the interaction between the catalyst and Phos-Chek®. The addition of Fyrol® FR-2 flame retardant in the polyurea foams with Freon 11B as blowing agent as shown in Table XII (Examples 28–31) resulted in an increase of oxygen index but no significant increase in the densities of the resulting polyurea foams as the content of Fyrol FR-2 increased. This result also indicated that Fyrol FR-2 had better fire retardance in the polyurea foams than alumina trihydrate, the results of which were described in the Examples hereinabove. In addition to having better fire retardance and only a slight change in the density of the resulting polyurea foams, Fyrol FR-2 in the polyurea foam formulation did not affect the rate of reaction in the processing. These advantages may be applied to the preparation of polyurea foams modified with the combination of Fyrol FR-2, alumina trihydrate and fly ash. The results are listed in Tables XV and XVI, Examples 35–41, infra. It was found that the flame resistance increased as the content of fly ash increased in the formulation. An increase in density was mainly due to the addition of fly ash in the system. The friability of the resulting foams increased as the fly ash content increased in the formulation. The flame resistance with the addition of Fyrol FR-2 and alumina trihydrate was not higher than that with Fyrol FR-2 alone in the polyurea foams. (Compare oxygen indices in Tables XV and XVI, in Examples 35–41, infra.)

EFFECT OF FREON 11B ON POLYUREA FOAMS

The addition of Freon 11B in the preparation of polyurea foams caused an increase in the rise time and tack free time in the processing (see Table XIII). The effect of Freon 11B on the density of the resulting polyurea foams was not so significant for the formulation containing 10 wt% (based on isocyanate) of this blowing agent. A reduction in density of the resulting polyurea foams was observed as the content of Freon 11B increased to 20 wt% in the formulation.

Besides water and trichlorofluoromethane, other blowing agents such as carbon dioxide, and $C_1$ to $C_2$-chlorofluoroalkanes such as tetrachlorofluoroethane and various chlorofluoromethanes and ethanes can be used to replace part or all of the trichlorofluoromethane (Freon 11B) shown above in these various polyurea foam compositions. The amount of total blowing agent in the composition can be up to about 20 wt % in the formulation to effect reductions in the density of the foam. Beyond 20 wt % of the blowing agent, blowing agents do not have significant effect or advantage in the formulations.

EXAMPLES 32 TO 34

EFFECT OF FLY ASH AND ALUMINA TRIHYDRATE ON POLYUREA FOAMS MODIFIED WITH ISOPROPANOL

The following polyurea foam formulations were made by the one-shot procedure described above so as to contain the indicated amounts of Freon 11B, alumina trihydrate and fly ash in the respective formulations. All of the Freon 11B, alumina trihydrate and fly ash components were added via the aqueous phase before the aqueous phase was blended with the polymeric isocyanate component.

TABLE XIV

Effect of Fly Ash and Alumina Trihydrate on the Polyurea Foams

| | Examples | | |
|---|---|---|---|
| | 32 | 33 | 34 |
| FORMULATION | | | |
| Mondur MR, g | 201.2 | 100.65 | 98.65 |
| H$_2$O, g | 27.0 | 13.50 | 13.50 |
| Isopropanol, g | 10.0 | 5.0 | 5.0 |
| L-53234, g | 4.0 | 2.0 | 2.0 |
| DC 198, g | 4.0 | 2.0 | 2.0 |
| Freon 11B, g | 40.0 | 20.0 | 20.0 |
| Al$_2$O$_3$ $\frac{1}{3}$H$_2$O, g | 80.0 | 40.0 | 40.0 |
| Fly ash, g | 20.0 | 20.0 | 40.0 |
| Isocyanate Index (without alcohol) | 50.4 | 50.5 | 49.5 |
| PROCESSING | | | |
| Cream time, sec | 35 | 35 | 35 |
| Rise time, sec | 75 | 90 | 100 |
| Tack free time, sec | 95 | 100 | 125 |
| PROPERTIES | | | |
| Density, pcf | 0.688 | 0.721 | 0.993 |
| Oxygen index | 23.25 | 23.25 | 24.50 |
| Compressive strength, psi | | | |
| $\parallel$ | 1.14 | 0.89 | 0.43 |
| $\perp$ | 0.54 | 0.57 | 0.41 |
| N-factor, btu-in/hr-ft$^2$-°F. | 0.52 | | |

EFFECT OF FLY ASH AND ALUMINA TRIHYDRATE IN POLYUREA FOAMS

The properties of polyurea foams modified with a combination of fly ash and alumina trihydrate are listed in Table XIV. The decrease in the compressive strength was observed as the content of fly ash increased in the formulation. This result was different from that of the formulation without alumina trihydrate. This phenomenon could be explained by the fact that the addition of alumina trihydrate in the formulation also caused a decrease in the compressive strength of the resulting polyurea foams. Therefore, the decrease in the compressive strength was attributed to the combination of alumina trihydrate and fly ash rather than to fly ash alone. The compressive strength increased as the content of fly ash was at 20 wt% (based on isocyanate) (see Table X), then gradually decreased as the contents of these mixtures (fly ash and alumina trihydrate) were over 50 wt% (10% of fly ash and 40% of alumina trihydrate based on isocyanate).

EXAMPLES 35 TO 41

EFFECT OF FYROD ® FR-2 AND FLY ASH (Ex 35-39) AND FYROL ®FR-2 AND ALUMINA TRIHYDRATE (Ex 40-41) ON PROPERTIES OF POLYUREA FOAMS

The following polyurea foam formulations were made by the one-shot procedure described above so as to contain the indicated amounts of Fyrol ®FR-2 flame retardant without, and then with, the indicated amounts of fly ash or alumina trihydrate. The Fyrol FR-2, fly ash, and alumina trihydrate components were all added via the aqueous phase before the aqueous phase was blended with the polymeric isocyanate component.

TABLE XV

Effect of Fly ash and Fyrol FR-2 on Polyurea foams

| | Examples | | | | |
|---|---|---|---|---|---|
| | 35 | 36 | 37 | 38 | 39 |
| FORMULATION | | | | | |
| Mondur MR, g | 51.2 | 50.5 | 50.57 | 51.28 | 48.9 |
| H$_2$O, g | 6.7 | 6.7 | 6.7 | 6.7 | 6.7 |
| Isopropanol, g | 2.5 | 2.5 | 2.5 | 2.5 | 2.5 |
| Polycat 17, g | 1.0 | 1.0 | 1.0 | 1.0 | 1.0 |
| L-540, g | 1.0 | 1.0 | 1.0 | 1.0 | 1.0 |
| Freon 11B, g | 10.0 | 10.0 | 10.0 | 10.0 | 10.0 |
| Fyrol FR-2, g | 5.0 | 5.0 | 5.0 | 10.0 | 10.0 |
| Fly ash, g | — | 10.0 | 20.0 | 10.0 | 20.0 |
| Isocyanate Index (without alcohols) | 51.7 | 51.0 | 51.10 | 51.8 | 49.4 |
| PROCESSING | | | | | |
| Cream time, sec | 28 | 28 | 30 | 28 | 35 |
| Rise time, sec | 50 | 70 | 85 | 60 | 87 |
| Tack free time, sec | 70 | 85 | 95 | 75 | 100 |
| PROPERTIES | | | | | |
| Density, pcf | 0.443 | 0.521 | 0.635 | 0.516 | 0.612 |
| Oxygen index | 22.75 | 23.25 | 23.50 | 24.50 | 24.75 |
| Friability % | 12.2 | 23.85 | 49.5 | 11.90 | 32.0 |

TABLE XVI

Effect of Combination of Fyrol FR-2 and Alumina trihydrate on Polyurea foams

| | Examples | |
|---|---|---|
| | 40 | 41 |
| FORMULATION | | |
| Mondur MR, g | 50.7 | 50.70 |
| H$_2$O, g | 6.7 | 6.7 |
| Isopropanol, g | 2.5 | 2.5 |
| Polycat 17, g | 1.0 | 1.0 |
| L-540, g | 1.0 | 1.0 |
| Freon 11B, g | 10.0 | 10.0 |
| Fyrol FR-2, g | 5.0 | 5.0 |
| Al$_2$O$_3$ $\frac{1}{3}$H$_2$O, g | 5.0 | 5.0 |
| Fly ash, g | 10 | 20.0 |
| Isocyanate Index | 51.2 | 51.2 |
| PROCESSING | | |
| Cream time, sec | 30 | 30 |
| Rise time, sec | 65 | 75 |
| Tack free time, sec | 75 | 90 |
| PROPERTIES | | |
| Density, pcf | 0.572 | 0.664 |
| Oxygen index | 24.25 | 24.5 |

TABLE XVI-continued

Effect of Combination of Fyrol FR-2 and Alumina trihydrate on Polyurea foams

| | Examples | |
|---|---|---|
| | 40 | 41 |
| Friability, % | 25.18 | 32.36 |

The above examples illustrate that Fyrol FR-2 flame retardant had better fire-retardant effect in the polyurea foams than did alumina trihydrate. In addition to having better fire retardance and only a slight change in the density of the resulting polyurea foams, Fyrol FR-2 in the polyurea foam formulations did not affect the rate of reaction in the processing. These advantages are illustrated by the results in Tables XV and XVI hereinabove, showing properties of polyurea foam formulations modified with the various combination of Fyrol FR-2, alumina trihydrate and fly ash. It is illustrated here that the flame resistance increased as the content of fly ash increased in the formulation. An increase in density was mainly due to the addition of fly ash in the system. The friability of the resulting foam increased as the fly ash content increased in the formulation. The flame resistance with the addition of Fyrol FR-2 and alumina trihydrate was not higher than with Fyrol FR-2 alone in the polyurea foams. (Compare the oxygen indices in Tables XV and XVI hereinabove.)

K-FACTOR OR VARIOUS MODIFIED POLYUREA FOAMS

The K-factors of various modified polyurea foams were measured by using a Dynatech Rapid-K testing machine. The results are listed in Tables IX to XIV. The values (from 0.42 to 0.52) of the measured K-factors were higher than those expected (0.22 for $CO_2$ blown polyurethane foams of about 2 pcf). This is due to the lower density and the open cell structure of the resulting polyurea foams compared to conventional polyurethane foams at densities of 1.5 to 3 pcf.

In the foregoing examples, the materials in the following tables were used to make the polyurea foam formulations. The tables set forth the trademark or code number designation and chemical composition or function, as best as presently known, and the corporate source of supply for each ingredient.

| Materials | | | |
|---|---|---|---|
| Designation | Chemical Composition | Eq. Wt. | Supplier |
| Isocyanate: | | | |
| Mondur MR | Polymeric isocyanate (polyphenyl polymethylene polyisocyanate) | 133 | Mobay Chemical Co. |
| Alcohol: | | | |
| Isopropanol | $(CH_3)_2CHOH$ | 60.1 | Mallinckrodt Inc. |
| Catalysts: | | | |
| A-51806 | Tertiary amine catalyst | | Abbott Labs. |
| A-54234 | Tertiary amine catalyst | | Abbott Labs. |
| Polycat 17 | Tertiary amine catalyst | | Abbott Labs. |
| Other Additives: | | | |
| L-540 | Silicone surfactant | | Union Carbide |
| DC 198 | Silicone surfactant | | Dow Corning |
| Alumina trihydrate | $Al_2O_3 \cdot 3H_2O$ | | Great Lake Minerals |
| Fyrol FR-2 | Tris-dichloropropyl phosphate | | Stauffer Chemical Co. |
| Fly ash | | | Detroit Edison |
| Calcium sulfate | $CaSO_4 \cdot \frac{1}{2}H_2O$ | | |
| Phos-Chek | Ammonium polyphosphate | | Monsanto |

| Materials | | | |
|---|---|---|---|
| Designation | Chemical Compound | Eq. Wt. | Supplier |
| Isocyanate: | | | |
| Mondur MR | Polymeric isocyanate | 133 | Mobay Chem. Co. |
| Polyols: | | | |
| Pluracol GP 730 | Poly(oxypropylene) derivative of glycerol | | BASF W. Corp. |
| Pluracol P-710 | Poly(oxypropylene) glycol | | BASF W. Corp. |
| Niax 31-28 | Poly(oxypropylene) derivative of glycerol capped with ethylene oxide grafted with acrylonitrile | 2003.0 | Union Carbide |
| Pluronic L-62 | Poly(oxyethylene) poly(oxypropylene) | | BASF W. Corp. |
| Diamine: | | | |
| Jeffamine D-2000 | Poly(oxypropylene) diamine | 1000.0 | Jefferson Chem. Co. |
| Alcohol: | | | |
| 1-Butanol | $CH_3CH_2CH_2CH_2OH$ | | |
| Catalysts: | | | |
| Dabco T | Substituted ammonium carboxylate | | Air Products Co. |
| Dabco TMR | Ammonium carboxylate | | Air Products Co. |
| Polycat 41 | N,N',N"-Tris(dimethylamino propyl) hexahydrotriazine | | Abbott Labs. |

-continued

| | | |
|---|---|---|
| T-12, DBTDL | Dibutyltin dilaurate | M & T Co. |
| A-51806 | Tertiary amine catalyst | Abbott Labs. |
| Other additives: | | |
| Freon 11-B | Trichlorofluoromethane blowing agent | Dupont |
| Fyrol PCF | Tris(beta-chloroethyl) phosphate | Stauffer Chem. Co. |
| L-540 | Silicone surfactant | Union Carbide |
| Fyrol FR-2 | Tris(dichloropropyl) phosphate | Stauffer Chem. Co. |

Additional Preparations (P) and Examples 860–884, 906–912, 1068, 1074, and 1080

In the same manner as given in the foregoing, the following additional Preparations and Examples were carried out and the information and results relating to each tabulated in various ways in TABLES IA through XIIA.

TABLE 1A

| | (ALL P) | | | | |
|---|---|---|---|---|---|
| Preparation | 860 | 861 | 862 | 863 | 864 |
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | — | 20.0 | 30.0 | 40.0 | 50.0 |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.39 | 0.56 | 0.62 | 0.73 | foam shrunk |
| Friability, % | 2 | 2 | 2 | 2 | foam shrunk |
| Oxygen Index | 20.2 | 21.5 | 22.0 | 22.5 | foam shrunk |

TABLE IIA

| Example | 865 | 866 | 867 | 868 | 869 |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | — | 20.0 | 30.0 | 40.0 | 50.0 |
| Ethanol, g | 5.0 | 5.0 | 5.0 | 5.0 | 5.0 |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.35 | 0.44 | 0.49 | 0.53 | 0.64 |
| Friability, % | 25.5 | 11.5 | 18.4 | 40.4 | 100 |
| Oxygen Index | 19.5 | 20.5 | 22.0 | 22.5 | 24.0 |

TABLE IIIA

| Example | 870 | 871 | 872 | 873 | 874 |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate | — | 20.0 | 30.0 | 40.0 | 50.0 |
| n-propanol, g | 5.0 | 5.0 | 5.0 | 5.0 | 5.0 |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density lb/ft$^3$ | 0.38 | 0.45 | 0.50 | 0.57 | 0.64 |
| Friability, % | 7.3 | 23.0 | 28.4 | 31.5 | 36.9 |
| Oxygen Index | 19.5 | 21.0 | 22.0 | 22.5 | 23.0 |

TABLE IVA

| Example | 875 | 876 | 877 | 878 | 879 |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | — | 20.0 | 30.0 | 40.0 | 50.0 |
| n-Butanol, g | 5.0 | 5.0 | 5.0 | 5.0 | 5.0 |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density lb/ft$^3$ | 0.36 | 0.46 | 0.50 | 0.57 | 0.68 |
| Friability, % | 5.2 | 15.0 | 17.4 | 16.85 | 44.4 |
| Oxygen Index | 19.0 | 20.5 | 21.5 | 22.5 | 23.5 |

TABLE VA

| Example | 880 | 881 | 882 | 883 | 884 |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | — | 20.0 | 30.0 | 40.0 | 50.0 |
| iso-propanol, g | 5.0 | 5.0 | 5.0 | 5.0 | 5.0 |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density lb/ft$^3$ | 0.39 | 0.49 | 0.58 | 0.61 | 0.70 |
| Friability, % | 2.0 | 7.6 | 10.3 | 6.51 | 6.41 |
| Oxygen Index | 19.5 | 20.5 | 21.0 | 22.0 | 23.0 |

TABLE VIA

| Example | 865 | 870 | 875 | 880 | 860(P) |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | — | — | — | — | — |
| Ethanol, g | 5.0 | — | — | — | — |
| n-propanol, g | — | 5.0 | — | — | — |
| n-Butanol, g | — | — | 5.0 | — | — |
| iso-propanol, g | — | — | — | 5.0 | — |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.35 | 0.38 | 0.36 | 0.39 | 0.43 |
| Friability, % | 25.5 | 7.3 | 5.2 | 2.0 | 2.0 |
| Oxygen Index | 10.5 | 19.5 | 19.0 | 19.5 | 20.0 |

TABLE VIIA

| Example | 866 | 871 | 876 | 881 | 861(P) |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate | 20.0 | 20.0 | 20.0 | 20.0 | 20.0 |
| Ethanol, g | 5.0 | — | — | — | — |
| n-propanol, g | — | 5.0 | — | — | — |
| n-Butanol, g | — | — | 5.0 | — | — |

TABLE VIIA-continued

| Example | 866 | 871 | 876 | 881 | 861(P) |
|---|---|---|---|---|---|
| Iso-propanol, g | — | — | — | 5.0 | — |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.44 | 0.45 | 0.46 | 0.49 | 0.58 |
| Friability, % | 11.5 | 23.0 | 15.0 | 7.6 | 2.0 |
| Oxygen index | 20.5 | 21.0 | 20.5 | 20.5 | 21.5 |

TABLE VIIIA

| Example | 867 | 872 | 877 | 882 | 862(P) |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | 30.0 | 30.0 | 30.0 | 30.0 | 30.0 |
| Ethanol, g | 5.0 | — | — | — | — |
| n-propanol, g | — | 5.0 | — | — | — |
| n-Butanol, g | — | — | 5.0 | — | — |
| iso-propanol, g | — | — | — | 5.0 | — |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.49 | 0.50 | 0.50 | 0.58 | 0.62 |
| Friability, % | 18.4 | 28.4 | 17.4 | 10.3 | 2.0 |
| Oxygen Index | 22.0 | 22.0 | 21.5 | 21.0 | 22.0 |

TABLE IXA

| Example | 868 | 873 | 878 | 883 | 863(P) |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | 40.0 | 40.0 | 40.0 | 40.0 | 40.0 |
| Ethanol, g | 5.0 | — | — | — | — |
| n-propanol, g | — | 5.0 | — | — | — |
| n-Butanol, g | — | — | 5.0 | — | — |
| iso-propanol, g | — | — | — | 5.0 | — |
| II | 50.12 | 50.12 | 50.12 | 50.12 | 50.12 |
| CT, sec. | 10 | 10 | 10 | 10 | 10 |
| Rt, sec. | 40 | 40 | 40 | 40 | 40 |
| TFT, sec. | 50 | 50 | 50 | 50 | 50 |
| Density, lb/ft$^3$ | 0.53 | 0.58 | 0.57 | 0.61 | 0.74 |
| Friability, % | 40.4 | 31.5 | 16.85 | 6.51 | 2.0 |
| Oxygen Index | 22.5 | 22.5 | 22.5 | 22.0 | 22.5 |

TABLE XA

| Example | 869 | 874 | 879 | 884 | 864(P) |
|---|---|---|---|---|---|
| Mondur MR, g | 100.0 | 100.0 | 100.0 | 100.0 | 100.0 |
| Water, g | 13.5 | 13.5 | 13.5 | 13.5 | 13.5 |
| L-540, g | 2.0 | 2.0 | 2.0 | 2.0 | 2.0 |
| Polycat 17, g | 2.0 | 2.0 | 2.0 | 2.0 | 2.0 |
| Alumina Trihydrate, g | 50.0 | 50.0 | 50.0 | 50.0 | 50.0 |
| Ethanol, g | 5.0 | — | — | — | — |
| n-propanol, g | — | 5.0 | — | — | — |
| n-Butanol, g | — | — | 5.0 | — | — |
| iso-propanol, g | — | — | — | 5.0 | — |
| II | 50.12 | 50.12 | 50.12 | 50.12 | 50.12 |
| CT, sec. | 10 | 10 | 10 | 10 | 10 |
| RT, sec. | 40 | 40 | 40 | 40 | 40 |
| TFT, sec. | 50 | 50 | 50 | 50 | 50 |
| Density, lb/ft$^3$ | 0.64 | 0.63 | 0.68 | 0.70 | foam shrunk |
| Friability, % | 100.0 | 36.9 | 44.4 | 6.41 | foam shrunk |
| Oxygen Index | 24.0 | 23.0 | 23.5 | 23.0 | foam shrunk |

TABLE XIA

| Example | #906 | #907 | #908 | #909 | #910 | #911 | #912 |
|---|---|---|---|---|---|---|---|
| Mondur MR, g | 100.0 | 100.0 | 100.0 | 100.0 | 100.0 | 100.0 | 100.0 |
| Water, g | 13.5 | 13.5 | 13.5 | 13.5 | 13.5 | 13.5 | 13.5 |
| L-540, g | 2.0 | 2.0 | 2.0 | 2.0 | 2.0 | 2.0 | 2.0 |
| Polycat-17, g | 2.0 | 2.0 | 2.0 | 2.0 | 2.0 | 2.0 | 2.0 |
| FR-2, g | 0 | 5.0 | 10.0 | 15.0 | 20.0 | 25.0 | 30.0 |
| iso-propanol, g | 5.0 | 5.0 | 5.0 | 5.0 | 5.0 | 5.0 | 5.0 |
| Cream Time, sec. | 10 | 10 | 10 | 10 | 10 | 10 | 10 |
| Rise Time, sec. | 40 | 40 | 35 | 40 | 40 | 40 | 40 |
| Tack Free Time, sec. | 60 | 70 | 60 | 60 | 60 | 70 | 70 |
| Oxygen Index | 19.50 | 21.00 | 22.00 | 23.00 | 23.50 | 24.00 | 24.50 |
| Friability, % | 2 | 11 | 2 | 2 | 2 | 2 | 2 |
| Density, lb/ft$^3$ | 0.42 | 0.43 | 0.41 | 0.42 | 0.43 | 0.42 | 0.43 |
| Density, kg/m$^3$ | 6.76 | 6.97 | 6.62 | 6.72 | 6.94 | 6.65 | 6.91 |

TABLE XIIA

| Example | #1068 | #1074 | #1080 |
|---|---|---|---|
| Water, g | 16.92 | 16.92 | 16.92 |
| L-540, g | 2.0 | 2.0 | 2.0 |
| Polycat-17, g | 2.0 | 2.0 | 2.0 |
| Mondur MR, g | 100.0 | 100.0 | 100.0 |
| Isopropyl Alcohol, g | 5.0 | 10.0 | 15.0 |
| Cream Time, sec. | 18 | 20 | 22 |
| Rise Time, sec. | 45 | 45 | 55 |
| Tack Free Time, sec. | 50 | 50 | 60 |
| Isocyanate Index (without Isopropyl Alcohol) | 40 | 40 | 40 |
| Isocyanate Index (with Isopropyl Alcohol) | 38.3 | 36.7 | 35.3 |
| Density, lbs/ft$^3$ | 0.44 | 0.41 | 0.39 |
| Oxygen Index | 19.5 | 19.5 | 19.5 |

In conclusion, from the foregoing, it is apparent that the present invention provides a novel polyurea foam, involving incorporation thereinto of a density-lowering and/or compressive-strength enhancing amount of a lower-alkanol or alkanediol, having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope of the appended claims.

We claim:

1. A polyurea foam prepared by reacting a polyphenyl polymethylene polyisocyanate with water in the presence of a catalyst and having incorporated therein a small but density-lowering amount or compressive-strength-increasing amount of a lower-alkanol.

2. A polyurea foam of claim 1 wherein the amount of lower-alkanol is up to about 15% based upon the weight of polyphenyl polymethylene polyisocyanate.

3. A polyurea foam of claim 2 wherein the amount of lower-alkanol is up to about 5% based upon the weight of polyphenyl polymethylene polyisocyanate.

4. A polyurea foam of claim 1 or 2, wherein the lower-alkanol has up to and including six carbon atoms.

5. A polyurea foam of claim 4, wherein the lower-alkanol is selected from the group consisting of methanol, ethanol, propanol, isopropanol, and butanol.

6. A polyurea foam of claim 1 or 2, wherein the alkanol is isopropanol.

7. A polyurea foam of claim 1 or 2, wherein the alkanol is methanol or ethane.

8. A polyurea foam of claim 1, 2, or 6, having incorporated therein a flame retardant additive.

9. A polyurea foam of claim 1, 2, or 6, having incorporated therein a filler.

10. A polyurea foam of claim 8, wherein the flame retardant additive is selected from the group consisting of alumina trihydrate, tris(dichloropropyl) phosphate, and mixtures thereof.

11. A polyurea foam of claim 9, wherein the filler is a compressive-strength improving amount of fly ash or calcium sulfate.

12. A polyurea foam of claim 11, wherein the filler is fly ash.

13. A polyurea foam of claim 11, having incorporated therein a flame-retarding amount of tris(dichloropropyl) phosphate.

14. A polyurea foam of claim 1 or 2, having incorporated therein a foam-blowing amount of a haloethane or halomethane.

15. A polyurea foam of claim 14, wherein the halomethane is trichlorofluoromethane.

* * * * *

UNITED STATES PATENT AND TRADEMARK OFFICE
CERTIFICATE OF CORRECTION

PATENT NO. : 4,454,251
DATED : June 12, 1984
INVENTOR(S) : Kurt C. Frisch and Heinz Baumann It is certified that error appears in the above—identified patent and that said Letters Patent is hereby corrected as shown below:

```
Col. 7, line 31; "indicatted" should read -- indicated --
Col. 8, line 25; "Mondor" should read -- Mondur --
Col. 14, line 19, second column; "0.559" should read -- 0.359 --
Col. 14, line 24; "0.80" should read --0.89 --
Col. 15, line 53; "N-factor," should read -- K-factor, --
Col. 19, line 5, third column; "Dupont" should read -- DuPont --
Col. 19, line 33, third column; "0.56" should read -- 0.58 --
Col. 21, line 48, last column; the blurred number is -- 13.5 --
Col. 21, line 56, first column; "Rt," should read -- RT, --
Col. 22, approximately line 19, in Table XIA, first line,
   third column; "100,0" should read -- 100.0 --
Col. 23, line 13; "ethane." should read -- ethanol. --
```

Signed and Sealed this

Twelfth Day of March 1985

[SEAL]

Attest:

DONALD J. QUIGG

Attesting Officer

Acting Commissioner of Patents and Trademarks